United States Patent
Lewis et al.

(10) Patent No.: US 9,436,391 B1
(45) Date of Patent: Sep. 6, 2016

(54) EFFICIENT SCALABLE I/O SCHEDULING

(71) Applicant: Formation Data Systems, Inc., Fremont, CA (US)

(72) Inventors: Mark S. Lewis, Pleasanton, CA (US); Vinay P. Rao, San Jose, CA (US); Anna Povzner, San Jose, CA (US); Subramanian Lakshmanan, San Jose, CA (US)

(73) Assignee: Formation Data Systems, Inc., Fremont, CA (US)

( * ) Notice: Subject to any disclaimer, the term of this patent is extended or adjusted under 35 U.S.C. 154(b) by 0 days.

(21) Appl. No.: 14/229,690

(22) Filed: Mar. 28, 2014

(51) Int. Cl.
*G06F 3/00* (2006.01)
*G06F 3/06* (2006.01)

(52) U.S. Cl.
CPC .......... *G06F 3/0613* (2013.01); *G06F 3/0653* (2013.01); *G06F 3/0674* (2013.01)

(58) Field of Classification Search
None
See application file for complete search history.

(56) References Cited

U.S. PATENT DOCUMENTS

| | | | |
|---|---|---|---|
| 4,771,375 A * | 9/1988 | Beglin et al. | 711/111 |
| 5,875,479 A * | 2/1999 | Blount et al. | 711/162 |
| 7,421,511 B2 * | 9/2008 | Shiga et al. | 709/235 |
| 7,480,780 B2 * | 1/2009 | Kitamura | 711/165 |
| 8,612,990 B1 | 12/2013 | Greenfield et al. | |
| 8,713,288 B2 * | 4/2014 | Yoshihara et al. | 712/30 |
| 8,782,363 B2 * | 7/2014 | Shitomi | 711/162 |
| 2001/0029543 A1 * | 10/2001 | Iwata et al. | 709/233 |
| 2002/0091902 A1 * | 7/2002 | Hirofuji | 711/133 |
| 2007/0055840 A1 * | 3/2007 | Yamamoto et al. | 711/165 |
| 2008/0183913 A1 * | 7/2008 | Ryu et al. | 710/25 |
| 2009/0006920 A1 * | 1/2009 | Munson | H04L 1/0002 714/748 |
| 2009/0132736 A1 * | 5/2009 | Hasan et al. | 710/56 |
| 2010/0030987 A1 * | 2/2010 | Na et al. | 711/162 |
| 2014/0240335 A1 * | 8/2014 | Hu et al. | 345/543 |

OTHER PUBLICATIONS

Bruno, J., et al., "Disk scheduling with quality of service guarantees," IEEE International Conference on in Multimedia Computing and Systems, Jul. 1999, vol. 2, pp. 400-405.
Gulati, A., et al., "mClock: handling throughput variability for hypervisor IO scheduling." Proceedings of the 9th USENIX conference on Operating systems design and implementation. USENIX Association, 2010, 14 pages.
Gulati, A., Author Profile Page, ACM Digital Library, 2015, 4 Pages, Can be Retrieved at <URL:http://dl.acm.org/author_page.cfm?id=81100425576&>.

(Continued)

*Primary Examiner* — Henry Tsai
*Assistant Examiner* — Aurangzeb Hassan
(74) *Attorney, Agent, or Firm* — Fenwick & West LLP

(57) ABSTRACT

An input/output (I/O) request is dispatched. A determination is made regarding a storage volume to service. A determination is made regarding whether an actual disk throughput exceeds a first threshold rate. The first threshold rate exceeds a reserved disk throughput. Responsive to determining that the actual disk throughput exceeds the first threshold rate, a first storage volume is selected based on credits or based on priority. Responsive to determining that the actual disk throughput does not exceed the first threshold rate, a second storage volume is selected based on guaranteed minimum I/O rate. An I/O request queue associated with the determined storage volume is determined. An I/O request is retrieved from the determined I/O request queue. The retrieved I/O request is sent to a persistence layer that includes the selected storage volume.

20 Claims, 7 Drawing Sheets

(56) References Cited

OTHER PUBLICATIONS

Jin, W., et al., "Interposed proportional sharing for a storage service utility." ACM SIGMETRICS Performance Evaluation Review. vol. 32. No. 1. ACM, 2004, pp. 37-48.

Marknelson, "Ceph Bobtail Performance—10 Scheduler Comparison," The Ceph Blog, Inktank Storage, Inc., Jan. 22, 2013, 11 Pages [online] [Retrieved on Jun. 23, 2015] Retrieved from the internet <URL:http://ceph.com/community/ceph-bobtail-performance-io-scheduler-comparison/>.

Merchant, A., Author Profile Page, ACM Digital Library, 2015, 4 Pages, Can be Retrieved at <URL:http://dl.acm.org/author_page.cfm?id=81100608622>.

Varman, P., Author Profile Page, ACM Digital Library, 2015, 4 Pages, Can be Retrieved at <URL:http://dl.acm.org/author_page.cfm?id=81550118756>.

Wong, T. M., et al., "Zygaria: Storage performance as a managed resource," Proceedings of the 12th IEEE In Real-Time and Embedded Technology and Applications Symposium, Apr. 2006, pp. 125-134.

Wu, J.C., et al., "The Design and Implementation of AQuA: An Adaptive Quality of Service Aware Object-Based Storage Device," Proc. of IEEE/NASA Goddard Conf. on Mass Storage Systems and Technologies (MSST 2006), pp. 209-218 (May 2006).

\* cited by examiner

EFFICIENT SCALABLE I/O SCHEDULING

BACKGROUND

1. Technical Field

The subject matter described herein generally relates to the field of input/output (I/O) request servicing systems, where the system dispatches I/O requests based on destination storage volumes.

2. Background Information

Consider an input/output (I/O) request servicing system where the system services multiple clients and dispatches I/O requests for the multiple clients. Each client has specified different performance parameters for their I/O requests. In order to provide a better experience for the clients, the system needs to dispatch I/O requests in a manner that meets all the specified parameters of the clients. If the number of clients is very large, then servicing clients and dispatching the I/O requests based on the specified performance parameters may not always meet the parameters specified given the large number of clients and, therefore, large number of I/O requests.

SUMMARY

The above and other issues are addressed by a method, non-transitory computer readable storage medium, and system for dispatching an input/output (I/O) request. An embodiment of the method comprises determining a storage volume to service. Determining the storage volume to service comprises: determining whether an actual disk throughput exceeds a first threshold rate, wherein the first threshold rate exceeds a reserved disk throughput; responsive to determining that the actual disk throughput exceeds the first threshold rate, selecting a first storage volume based on credits or based on priority; and responsive to determining that the actual disk throughput does not exceed the first threshold rate, selecting a second storage volume based on guaranteed minimum I/O rate. The method further comprises determining an I/O request queue associated with the determined storage volume. The method further comprises retrieving an I/O request from the determined I/O request queue. The method further comprises sending the retrieved I/O request to a persistence layer that includes the selected storage volume.

An embodiment of the medium stores computer program modules executable to perform steps. The steps comprise determining a storage volume to service. Determining the storage volume to service comprises: determining whether an actual disk throughput exceeds a first threshold rate, wherein the first threshold rate exceeds a reserved disk throughput; responsive to determining that the actual disk throughput exceeds the first threshold rate, selecting a first storage volume based on credits or based on priority; and responsive to determining that the actual disk throughput does not exceed the first threshold rate, selecting a second storage volume based on guaranteed minimum I/O rate. The method further comprises determining an I/O request queue associated with the determined storage volume. The method further comprises retrieving an I/O request from the determined I/O request queue. The method further comprises sending the retrieved I/O request to a persistence layer that includes the selected storage volume.

An embodiment of the system comprises a non-transitory computer-readable storage medium storing computer program modules executable to perform steps. The steps comprise determining a storage volume to service. Determining the storage volume to service comprises: determining whether an actual disk throughput exceeds a first threshold rate, wherein the first threshold rate exceeds a reserved disk throughput; responsive to determining that the actual disk throughput exceeds the first threshold rate, selecting a first storage volume based on credits or based on priority; and responsive to determining that the actual disk throughput does not exceed the first threshold rate, selecting a second storage volume based on guaranteed minimum I/O rate. The method further comprises determining an I/O request queue associated with the determined storage volume. The method further comprises retrieving an I/O request from the determined I/O request queue. The method further comprises sending the retrieved I/O request to a persistence layer that includes the selected storage volume.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
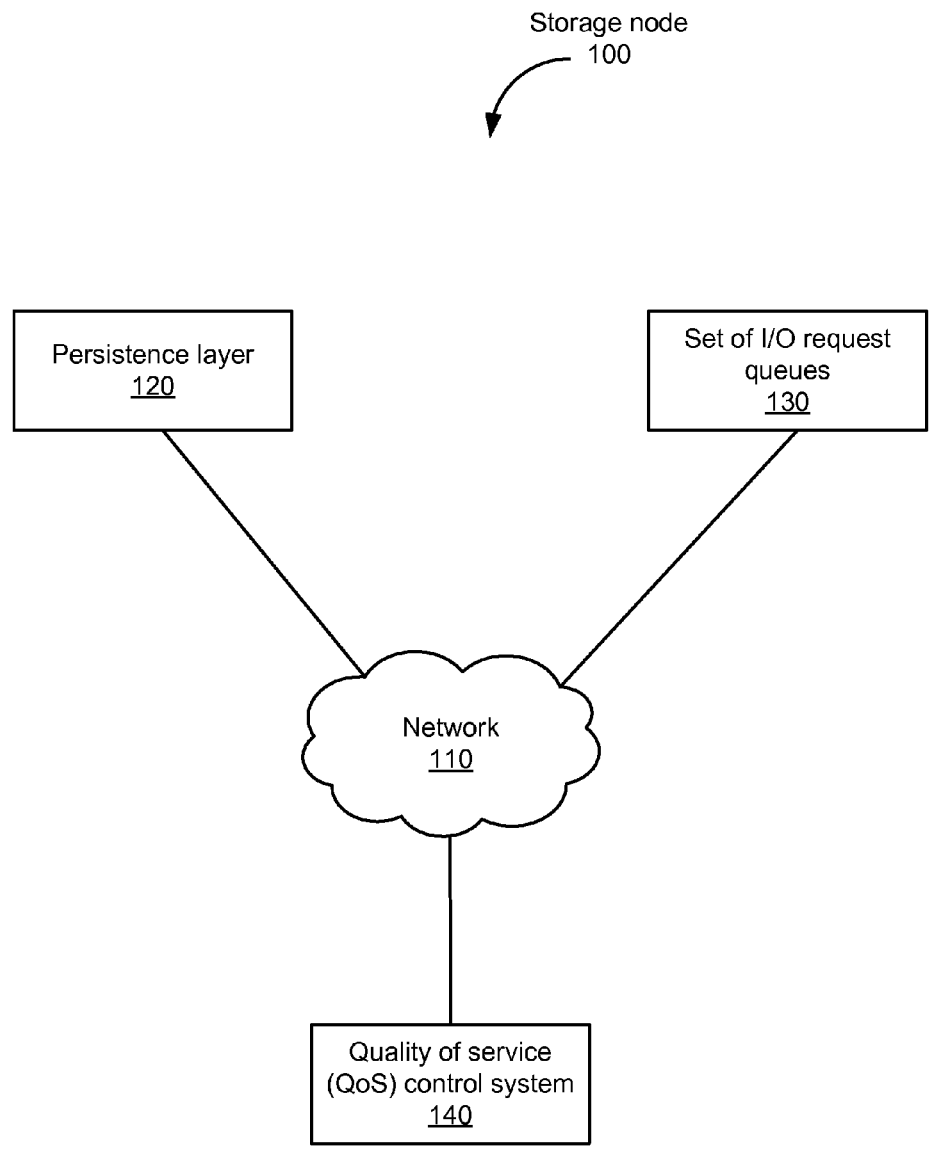
FIG. 1 is a high-level block diagram illustrating a storage node, according to one embodiment.

FIG. 1 is a high-level block diagram illustrating a storage node 100, according to one embodiment. The storage node 100 may be maintained by an enterprise (e.g., a corporation) that manages input/output (I/O) requests for clients. As shown, the storage node 100 includes a network 110, a persistence layer 120, a set of I/O request queues 130, and a quality of service (QoS) control system 140.

The network 110 represents the communication pathway between the persistence layer 120, the set of I/O request queues 130, and the QoS control system 140. In one embodiment, the network 110 uses standard communications technologies and/or protocols and can include the Internet. In another embodiment, the entities on the network 110 can use custom and/or dedicated data communications technologies.

The persistence layer 120 includes multiple data storage devices, and each data storage device includes multiple storage volumes. In one embodiment, the storage devices can be servers, non-volatile storage, flash memory devices, hard disk drives (HDD), solid state drives (SSD), storage area networks (SANs), any other suitable storage devices, and any combination thereof.

Each volume in the data storage devices is associated with an I/O request queue which is stored in the set of I/O request queues 130. An I/O request specifies a particular storage volume and can be a write ("put") or a read ("get"). Each queue is associated with one or more clients who have purchased guaranteed rates for their I/O requests. In one embodiment, the guaranteed rates are measured by input/output operations per second (IOPS). Multiple clients can be associated with the same volume, and clients can be associated with one or more I/O request queues.

The quality of service (QoS) control system 140 is a computer (or set of computers) that retrieves an I/O request from the set of I/O request queues 130 and dispatches or sends the I/O request to the persistence layer 120 in a manner that ensures that the guaranteed rates (e.g., a minimum IOPS and/or maximum IOPS) purchased by clients are met for each client during each scheduling period. For example, a scheduling period is the duration of accessing each slot in a rate-based scheduling sequence once. In general, the QoS control system 140 determines whether to send an I/O request to the persistence layer 120. If so, the QoS control system 140 determines a volume to service in the persistence layer 120. Then, the QoS control system 140 retrieves an I/O request from the set of I/O request queues 130 associated with the determined volume. Finally, the QoS control system 140 dispatches the retrieved I/O request to the persistence layer 120. The QoS control system 140 is further described below with reference to FIGS. 3-7.

Figure 2:
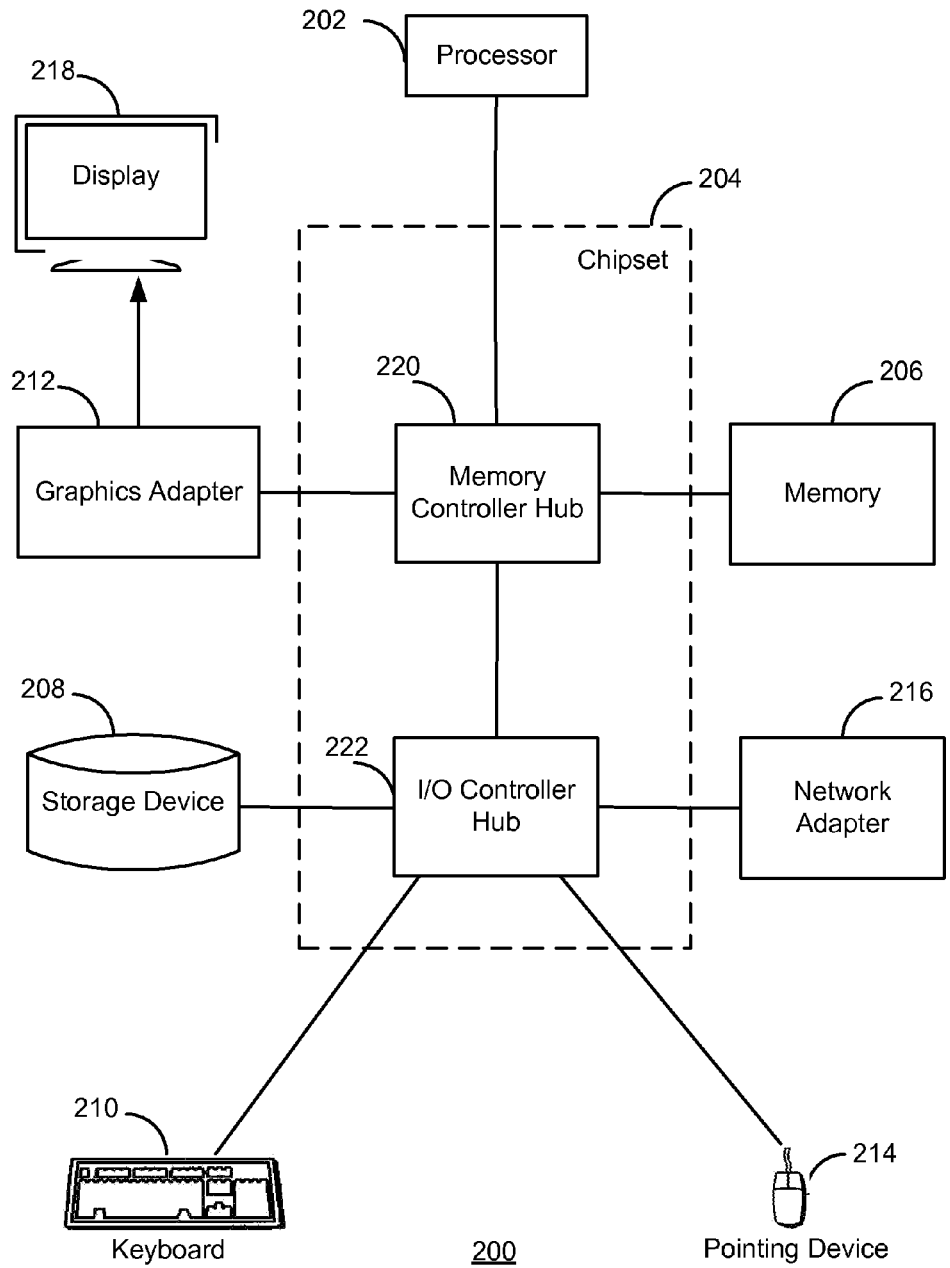
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the QoS control system 140 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
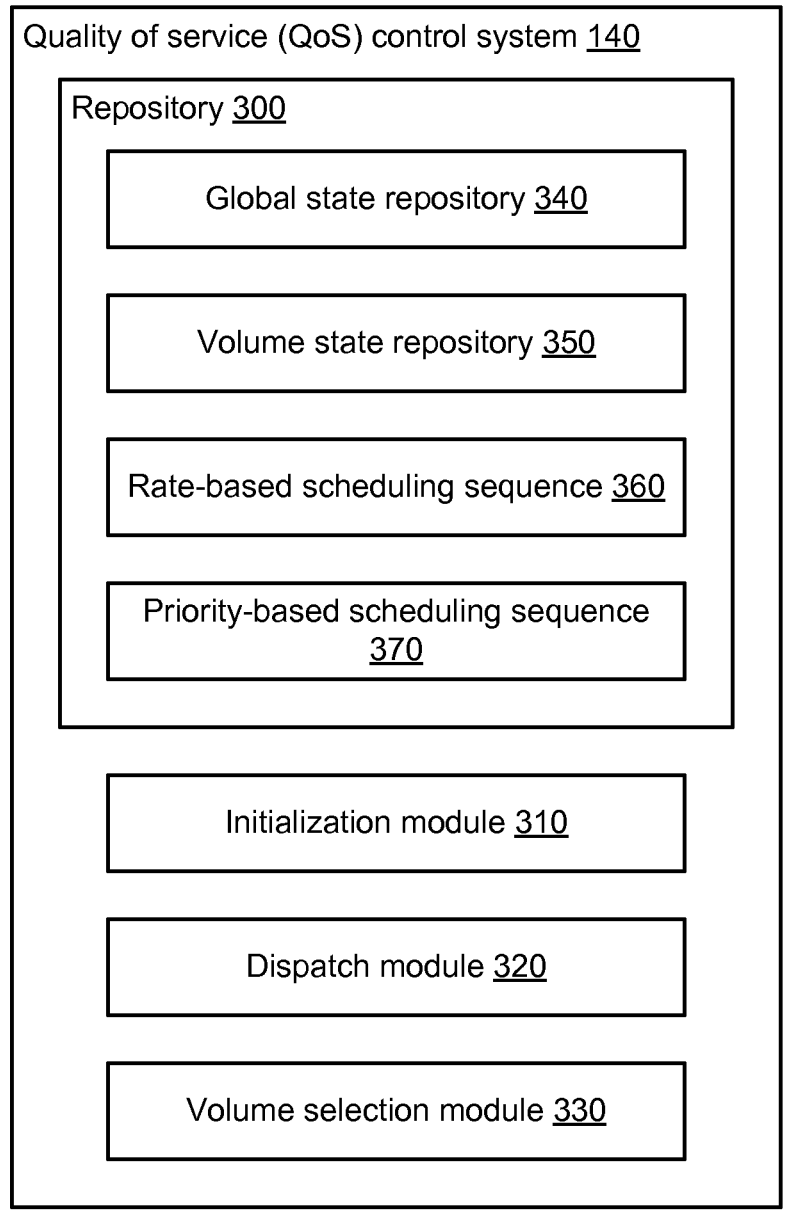
FIG. 3 is a high-level block diagram illustrating a quality of service (QoS) control system, according to one embodiment.

FIG. 3 is a high-level block diagram illustrating a quality of service (QoS) control system 140, according to one embodiment. The QoS control system 140 selects an I/O request from the set of I/O request queues 130 and sends that I/O request to the persistence layer 120. The system 140 includes a repository 300, an initialization module 310, a dispatch module 320, and a volume selection module 330. The repository 300 is a computer (or set of computers) that stores a global state repository 340, a volume state repository 350, a rate-based scheduling sequence 360, and a priority-based scheduling sequence 370.

The global state repository 340 stores information about I/O requests that applies to the entire persistence layer 120. The repository 340 stores a number of pending I/O requests, a number of outstanding I/O requests, and a maximum number of outstanding I/O requests. The number of pending I/O requests is a total number of I/O requests that are in the set of I/O request queues 130 but not yet dispatched to the persistence layer 120. For example, the number of pending I/O requests stored in the global state repository 340 is a total number of all accumulated I/O requests in the set of I/O request queues 130. The number of outstanding I/O requests is a total number of I/O requests that have been retrieved from the set of I/O request queues 130 and dispatched to the persistence layer 120 but have not yet been acknowledged by the persistence layer 120 as having been completed. The maximum number of outstanding I/O requests is a maximum number of allowable outstanding I/O requests in the persistence layer 120. For example, the QoS control system 140 can determine whether to send an I/O request to the persistence layer 120 based on the number of outstanding I/O requests and the maximum number of outstanding I/O requests.

The global state repository 340 also stores a number of guaranteed I/O requests dispatched since the start of a rate-based scheduling period, a timestamp of the start of the rate-based scheduling period, and a current rate of guaranteed I/O requests. A "guaranteed" I/O request that was dispatched by the QoS control system 140 to the persistence layer 120 is an I/O request that was selected by the QoS control system 140 based on the guaranteed rate purchased by a client (i.e., selected based on the rate-based scheduling sequence). Thus, the number of guaranteed I/O requests dispatched since the start of a rate-based scheduling period is the accumulated number of all I/O requests selected and dispatched by the control system 140 based on the guaranteed rates purchased by clients. The rate-based scheduling sequence can also be associated with a rate-based scheduling period that indicates an interval of time in which to meet the guaranteed rates for the clients. The timestamp indicates when the rate-based scheduling period began. Based on guaranteed rates purchased by a known number of clients, a total number of I/O requests necessary to be executed to ensure the guaranteed rates are met (i.e., the reserved disk throughput) can be calculated for the rate-based scheduling period. Thus, based on the number of guaranteed I/O requests dispatched since the start of the rate-based scheduling period and the timestamp indicating the start of the rate-based scheduling period, the current rate of guaranteed I/O requests (i.e., the actual disk throughput) can be determined.

The volume state repository 350 stores information about or specific to each storage volume within the persistence layer 120. In one embodiment, stored information per volume includes a volume identifier (volID), a minimum rate of guaranteed I/O requests, and a maximum rate of guaranteed I/O requests. The minimum rate of guaranteed I/O requests per volume can be set by a client who has purchased a guaranteed rate and is used to generate the rate-based scheduling sequence 360. For example, the minimum rate of guaranteed I/O requests per volume can be used to determine how many times a volume is represented in the rate-based scheduling sequence 360 in order to ensure that the minimum rate of guaranteed I/O requests per volume is met by the time the rate-based scheduling period expires. The maximum rate of guaranteed I/O requests per volume can be set by a client as well and can be used to determine whether to service the volume. The maximum rate of guaranteed I/O requests per volume can also be used to determine a maximum amount of credits allowable for the volume. In one embodiment, the minimum and maximum rates of guaranteed I/O requests are measured in IOPS.

In one embodiment, the volume state repository 350 also stores, for each volume, a priority for using excess or unused I/O resources, a weight, a number of credits currently accumulated (i.e., since the start of the rate-based scheduling period), a maximum credit limit, and a pointer to an I/O request queue within the set of I/O request queues 130. The priority for using excess or unused I/O resources can be set by the client and is measured relative to the other volumes in the persistence layer 120. For example, priority can be based on payment (e.g., "normal" service vs premium service). So, if a client decides to pay for a "premium" service, then priority for the client increases through a higher priority for associated volumes and, therefore, I/O requests associated with the associated volumes. The priority for using excess or unused I/O resources can be a positive integer.

Based on the priority for using excess or unused I/O resources, a weight is calculated by the QoS control system 140 and used to generate a priority-based scheduling sequence 370. For example, the weight can be an integer value, a normalized value (e.g., out of 1 or 100), and/or be different for one or more storage volumes in the persistence layer 120. In one embodiment, the weight is calculated based on the difference between a maximum priority allowed for a volume and actual priority of the volume. For example, the weight can be equal to the maximum priority minus the priority of the volume. The maximum priority allowed per volume can be stored in the global state repository 340.

Figure 6:
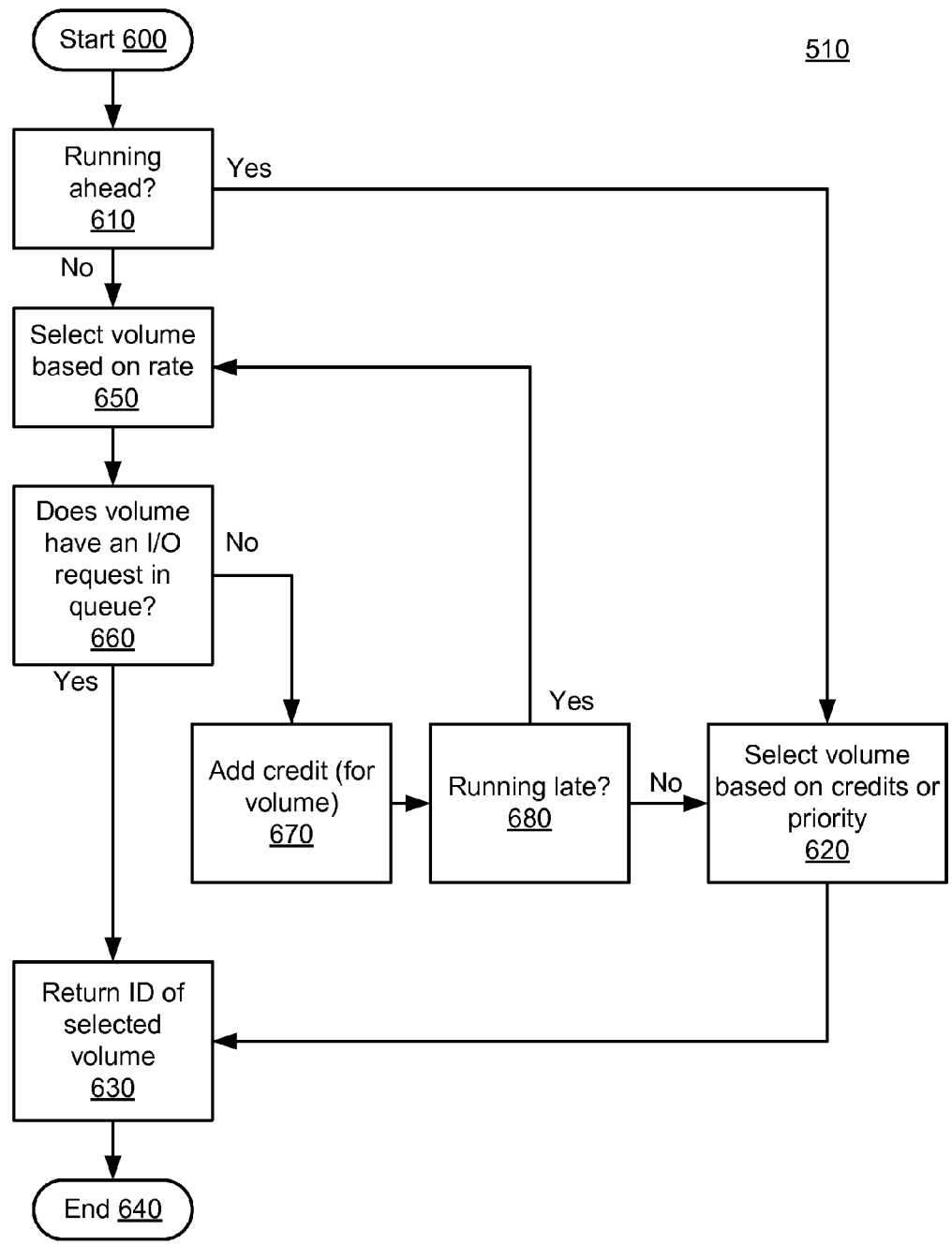
FIG. 6 is a flowchart illustrating a method of determining a storage volume to service, according to one embodiment.
Figure 7:
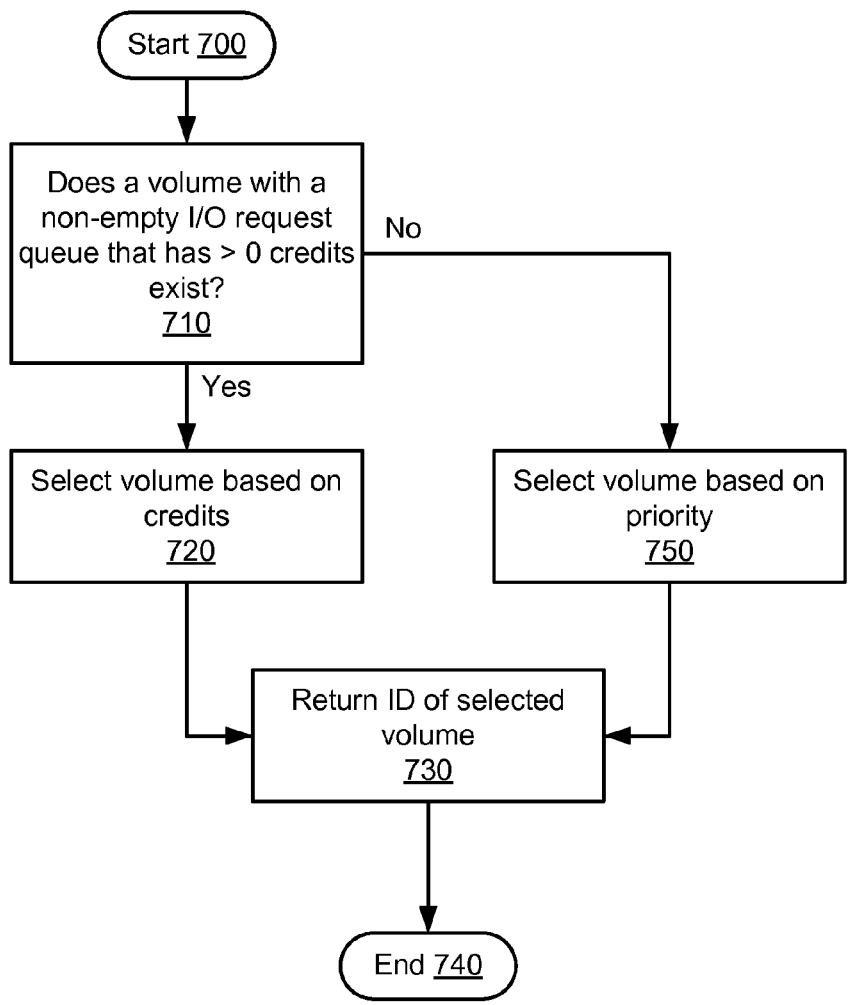
FIG. 7 is a flowchart illustrating a method of selecting a storage volume based on credits or priority, according to one embodiment.

The number of credits currently accumulated is associated with each volume and is an accumulation since the start of the rate-based scheduling period. The number of credits accumulated for each volume is used to select a storage volume based on credits, as shown in FIG. 7. Each volume is also associated with a maximum credit limit. The maximum credit limit for a volume is calculated based on the maximum rate of guaranteed I/O requests for that volume. In another embodiment, the maximum credit limit can be set by the QoS control system 140 and be one value that is set for all volumes in the persistence layer 120. The maximum credit limit associated with each volume or for one or more of the volumes is used to determine a storage volume to service, as shown in FIG. 6. The volume state repository 350 also stores pointers associated with each I/O request queue within the set of I/O request queues 130. A pointer of an I/O request queue points to an index in the I/O request queue indicating which I/O request in the I/O request queue is next to be dispatched to the associated volume in the persistence layer 120.

The initialization module 310 generates the rate-based scheduling sequence 360 and sets a pointer associated with the rate-based scheduling sequence 360 to an index in the sequence 360. The rate-based scheduling sequence 360 is a list with a plurality of slots. The number of slots in the plurality of slots equals the reserve disk throughput, which is the sum of $\min(V_i)$ over all volumes where $\min(V_i)$ represents the minimum rate of guaranteed I/O requests for volume i. Thus, if volume 1 ($V_1$) needs X slots in the sequence 360 to ensure the minimum rate of guaranteed I/O requests ($\min(V_1)$=X) and volume 2 ($V_2$) needs Y slots in the sequence 360 to ensure the minimum rate of guaranteed I/O requests ($\min(V_2)$=Y), then the sequence 360 has at least X+Y slots in the sequence 360 (assuming that $V_1$ and $V_2$ are the only volumes being serviced by the QoS control system 140). Each slot with an index equal to $R/\min(V_i)$ is filled with an identifier for volume $V_i$, where R is the total number of slots in the sequence 360. In other words, every $R/\min(V_i)$ slot is filled with an identifier for volume $V_i$, and volume $V_i$ is in the sequence 360 every $R/\min(V_i)$ times. If a slot with an index equal to $R/\min(V_i)$ is already filled with another volume j's identifier (where i is not j), then the next empty slot is filled with volume i's identifier. The pointer associated with the rate-based scheduling sequence 360 is set to the index associated with the first slot in the sequence 360 at the start of the rate-based scheduling period.

The initialization module 310 also generates the priority-based scheduling sequence 370 and sets a pointer associated with the priority-based scheduling sequence 370 to an index in the sequence 370. The priority-based scheduling sequence 370 is generated in a similar manner as the rate-based scheduling sequence but with certain differences. The priority-based scheduling sequence 370 is also a list with a plurality of slots, but the number of slots in the plurality of slots equals the sum of weights assigned to the volumes. In other words, the sum of the weights is equal to how many slots are in the sequence 370. For example, the weights of the volumes can be integer values. In another example, the weights of the volumes can be normalized values (e.g., out of 1), and the sum of the weights and the individual weights can be used to determine a percentage of the slots in the sequence 370 to assign to each volume. If volume 1 ($V_1$) has weight X ($w(V_1)$=X) and volume 2 ($V_2$) has weight Y ($w(V_2)$=Y), then the sequence 370 has at least X+Y slots in the sequence 370 (assuming $V_1$ and $V_2$ are the only volumes being serviced by the QoS control system 140 and the weights are integer values). Else, if the weights are normalized values, the sequence 370 has at least X/(X+Y) of the slots in the sequence 370 filled with the volume identifier of volume 1 and at least Y/(X+Y) of the slots in the sequence 370 filled with the volume identifier of volume 2 (again, if $V_1$ and $V_2$ are the only volumes being serviced by the QoS control system 140). Continuing with the example of the weights as integers, each slot with an index equal to $W/w(V_i)$ is filled with the volume identifier of volume i, where W is the sum of the weights of the volumes and can equal the total number of slots in the sequence 370. Thus, volume $V_i$ is in the sequence 370 every $W/w(V_i)$ times. If a slot with an index equal to $W/w(V_i)$ is already filled with another volume j's identifier (where i is not j), then the next empty slot is filled with volume i's identifier. The pointer associated with the priority-based scheduling sequence 370 is set to the index associated with the first slot in the sequence 370 at the start of the priority-based scheduling period.

The initialization module 310 also sets the initial values within the global state repository 340. For example, the initial values are set when the rate-based scheduling period begins.

Figure 4:
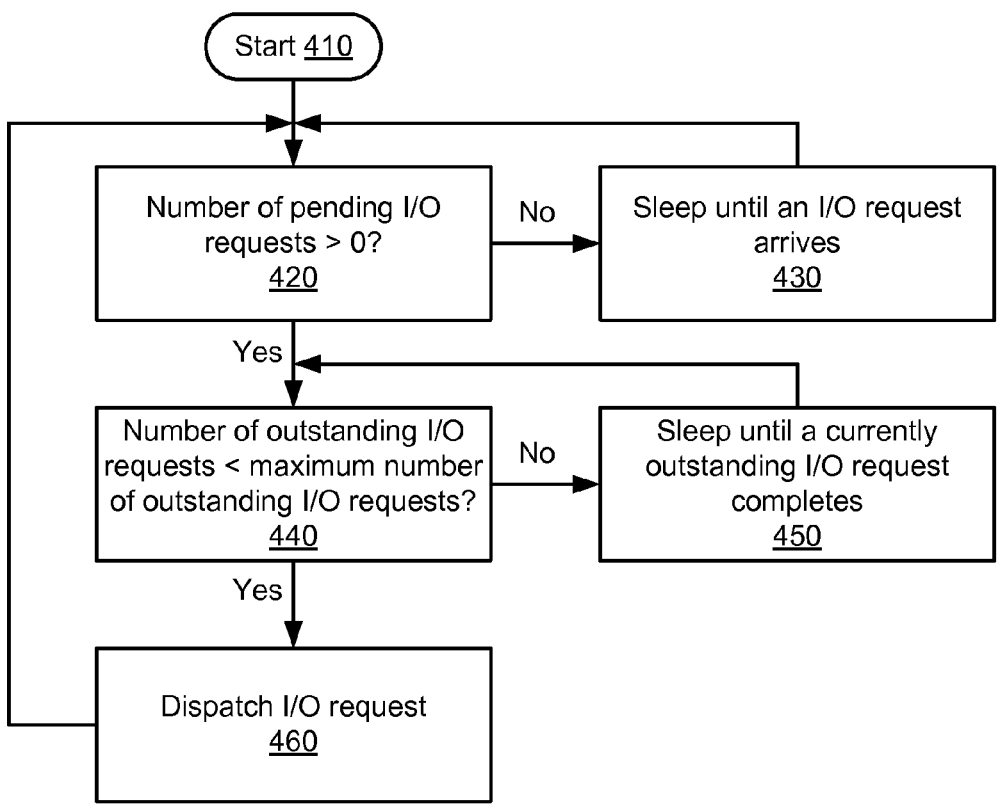
FIG. 4 is a flowchart illustrating a method of determining whether to dispatch an I/O request, according to one embodiment.
Figure 5:
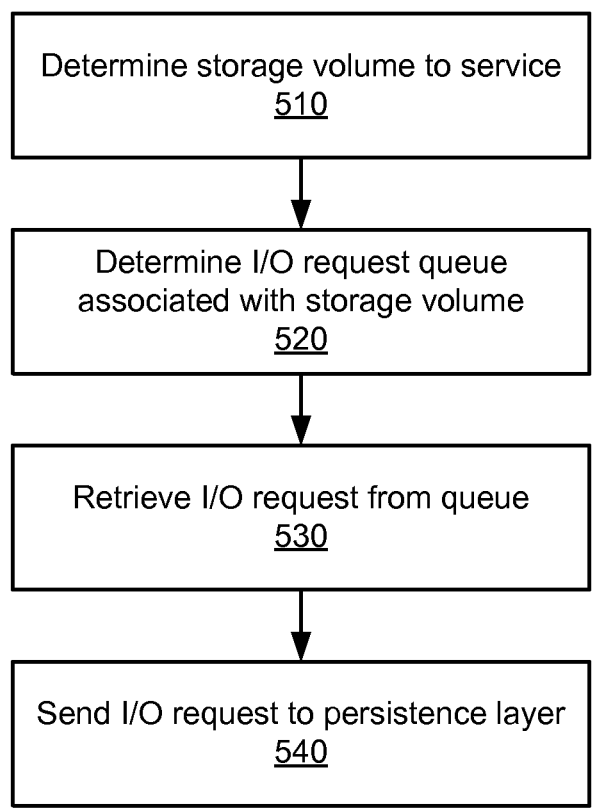
FIG. 5 is a flowchart illustrating a method of dispatching an I/O request, according to one embodiment.

The dispatch module 320 determines whether to dispatch an I/O request from the set of queues 130 to the persistence layer 120 and is further described in conjunction with FIGS. 4 and 5. The volume selection module 330 determines which volume to service and is further described in conjunction with FIGS. 6 and 7.

FIG. 4 is a flowchart illustrating a method 400 of determining whether to dispatch an I/O request, according to one embodiment. In one embodiment, the method 400 is performed by the dispatch module 320 periodically, when a new I/O request is entered in a queue in the set of I/O request queues 130, or an occurrence of another event. Other embodiments can perform the steps in different orders and can include different and/or additional steps. In addition, some or all of the steps can be performed by entities other than those shown in FIG. 3.

When the method 400 starts 410, a determination is made regarding whether the number of pending I/O requests exceeds a threshold number of pending I/O requests, as in step 420. In one embodiment, the threshold number of pending I/O requests is zero. If the number of pending I/O requests does not exceed the threshold number, then the method proceeds to step 430. In step 430, the dispatch module 320 sleeps until an I/O request arrives 430, at which point the method proceeds to step 420.

If the number of pending I/O requests exceeds the threshold, then the method 400 proceeds to step 440. In step 440, a determination is made regarding whether the number of outstanding I/O requests is less than the maximum number of outstanding I/O requests. If the number of outstanding I/O requests is greater than or equal to the maximum number, then the method proceeds to step 450.

In step 450, the dispatch module 320 sleeps until a currently outstanding I/O request completes, at which point the method proceeds to step 440. If the number of outstanding I/O requests is less than the maximum number of outstanding I/O requests, then the method proceeds to step 460, where an I/O request is dispatched from the set of I/O request queues 130 to the persistence layer 120. Every time an I/O request is dispatched from the queues 130 to the persistence layer 120 or a currently outstanding I/O request completes, the number of pending I/O requests and/or the number of outstanding I/O requests stored in the global state repository 340 are updated, respectively.

FIG. 5 is a flowchart illustrating a method 460 of dispatching an I/O request, according to one embodiment. The method 460 in FIG. 5 corresponds to the step 460 in FIG. 4 and is performed by the dispatch module 320. Other embodiments can perform the steps in different orders and can include different and/or additional steps. In addition, some or all of the steps can be performed by entities other than those shown in FIG. 3.

In step 510, a storage volume to service is determined. For example, the storage volume is determined based on status of the volumes in the persistence layer 120 as described further in conjunction with FIG. 6. The status of the volumes can be, for example, based on the rate-based scheduling sequence, the priority-based scheduling sequence, and credits associated with the volumes.

In step 520, an I/O request queue associated with the determined storage volume is determined. For example, each volume is associated with one queue in the set of I/O request queues 130, and the association is stored in the volume state repository 350.

In step 530, an I/O request is retrieved from the queue associated with the determined volume. For example, it is the I/O request next in the queue as indicated by the pointer associated with the I/O request queue, where the I/O requests in a queue are processed in first-in-first-out (FIFO) order.

In step 540, the retrieved I/O request is sent to the persistence layer 120. Again, the number of pending I/O requests and the number of outstanding I/O requests are updated in the global state repository 340.

FIG. 6 is a flowchart illustrating a method 510 of determining a storage volume to service, according to one embodiment. The method 510 in FIG. 6 corresponds to the step 510 in FIG. 5 and is performed by the volume selection module 330. Other embodiments can perform the steps in different orders and can include different and/or additional steps. In addition, some or all of the steps can be performed by entities other than those shown in FIG. 3.

When the method 510 starts 600, a determination is made regarding whether the current rate of guaranteed I/O requests (i.e., the actual disk throughput of guaranteed I/O requests) is running ahead compared to the reserved disk throughput in step 610. For example, the actual disk throughput is running ahead if the current rate of guaranteed I/O requests exceeds a threshold rate that is based on the reserved disk throughput. The threshold rate exceeds the reserved disk throughput. In one embodiment, the actual disk throughput is calculated based on the number of guaranteed I/O requests serviced (including rate-based slots serviced and rate-based slots skipped) in a time interval. If the actual disk throughput is running ahead, the method 510 proceeds to step 620.

In step 620, the volume to service is selected based on credits or priority associated with the volume, as described further in FIG. 7. Then, the ID of the selected volume is returned in step 630, and the method ends 640.

If the actual disk throughput is not running ahead in step 610, the method proceeds to step 650 and the volume to service is selected based on rate (i.e., the rate-based scheduling sequence 360 and its index).

Then, in step 660, a determination is made regarding whether the selected volume in step 650 has an I/O request in its associated queue. If the selected volume has an I/O request in its queue, the ID of the selected volume is returned in step 630, and the method ends 640.

If the selected volume does not have any I/O requests in its queue in step 660, one credit is added for the volume in step 670 unless the volume already has the maximum number of credits. For example, credit is added by incrementing the number of credits stored in the volume state repository 350 associated with the selected volume.

Then, in step 680, a determination is made regarding whether the current rate of guaranteed I/O requests (i.e., the actual disk throughput of guaranteed I/O requests) is running late compared to the reserved disk throughput. For example, the actual disk throughput is running late if the current rate of guaranteed I/O requests is less than a threshold rate (that is based on the reserved disk throughput). The threshold rate is less than the reserved disk throughput. For example, the threshold rate in step 680 is less than the threshold rate in step 610. If the sequence 360 is not running late, the volume is selected based on credits or priority in step 620. If the sequence is running late, the volume is selected based on rate in step 650.

FIG. 7 is a flowchart illustrating a method 620 of selecting a storage volume based on credits or priority, according to one embodiment. The method 620 in FIG. 7 corresponds to the step 620 in FIG. 6 and is performed by the volume selection module 330. Other embodiments can perform the steps in different orders and can include different and/or additional steps. In addition, some or all of the steps can be performed by entities other than those shown in FIG. 3.

When the method 620 starts 700, a determination is made regarding whether a volume with a non-empty I/O request queue that has more than 0 credits exists, as in step 710.

In step 720, if a volume with a non-empty I/O request queue that has more than 0 credits does exist, a volume to service is selected based on credits. For example, the volume to service is the volume with the highest number of credits. If multiple volumes have the highest number of credits, one of the multiple volumes is selected randomly.

In step 730, the ID of the selected volume is returned, and the method ends 740. If a volume with a non-empty I/O request queue that has more than 0 credits does not exist, a volume to service is selected based on priority (i.e., based on the priority-based scheduling sequence 370 and its index) in step 750. Then, in step 730, the ID of the selected volume is returned, and the method ends 740.

If an I/O request is dispatched based on the rate-based scheduling sequence 360, the number of guaranteed I/O requests dispatched since the start of the rate-based scheduling period and the current rate of guaranteed I/O requests are updated in the global state repository 340. In addition, the number of credits associated with the volume associated with the I/O request can be decremented in various embodiments. If an I/O request is dispatched based on credits, the number of credits associated with the volume associated with the I/O request is decremented.

If a new volume is added to the persistence layer 120, the rate-based scheduling sequence 360 and the priority-based scheduling sequence 370 are recalculated by the initialization module 310. The number of slots in the rate-based scheduling sequence 360 will increase to include the slots associated with the minimum rate of guaranteed I/O requests associated with the new volume. The slots of the recalculated sequences 360 and 370 are filled using the same method as described above in conjunction with the initialization module 310. If a volume is deleted, the slots associated with the deleted volume are removed from the rate-based scheduling sequence 360 and the priority-based scheduling sequence 370.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of selecting and dispatching an input/output (I/O) request from a set of I/O requests for a plurality of clients, the I/O requests specifying read or write from storage volumes for the clients, the storage volumes stored on a shared storage device, the storage volumes further having guaranteed minimum I/O rate requirements, the method comprising:
   determining a storage volume to service, which comprises:
      determining whether an actual disk throughput of I/O requests for the shared storage device exceeds a first threshold rate that is based on and exceeds a reserved disk throughput for the shared storage device, wherein the reserved disk throughput is a rate of I/O requests necessary to meet the guaranteed minimum I/O rate requirements for the storage volumes stored on the shared storage device;
      responsive to determining that the actual disk throughput exceeds the first threshold rate, selecting the storage volume to service based on credits for the storage volumes or based on priority for the storage volumes; and
      responsive to determining that the actual disk throughput does not exceed the first threshold rate, selecting the storage volume to service based on the guaranteed minimum I/O rate requirements for the storage volumes stored on the shared storage device;
   determining an I/O request queue associated with the determined storage volume;
   retrieving an I/O request from the determined I/O request queue; and
   sending the retrieved I/O request to a persistence layer that includes the shared storage device.

2. The method of claim 1, wherein determining the storage volume to service further comprises:
   determining whether an I/O request queue associated with the storage volume is empty; and
   responsive to determining that the I/O request queue associated with the storage volume is empty:
      adding a credit for the storage volume;
      determining whether the actual disk throughput is less than a second threshold rate that is less than the reserved disk throughput;
      responsive to determining that the actual disk throughput meets the second threshold rate, selecting another storage volume to service based on the credits for the storage volumes or based on the priority for the storage volumes; and
      responsive to determining that the actual disk throughput is less than the second threshold rate, selecting the other storage volume to service based on the guaranteed minimum I/O rate requirements for the storage volumes stored on the shared storage device.

3. The method of claim 2, wherein adding a credit for the storage volume is performed only if a number of credits associated with the storage volume is less than a maximum credit limit.

4. The method of claim 1, wherein the actual disk throughput is based on a number of I/O requests dispatched based on rate and a number of storage volumes that were selected based on rate but had zero I/O requests in an associated I/O request queue.

5. The method of claim 1, wherein selecting the storage volume to service based on the guaranteed minimum I/O rate requirements for the storage volumes stored on the shared storage device comprises selecting the storage volume according to a rate-based scheduling sequence, the rate-based scheduling sequence comprising a minimum number of slots per storage volume necessary to meet the guaranteed minimum I/O rate requirement for each storage volume stored on the shared storage device.

6. The method of claim 1, wherein selecting the storage volume to service based on priority for the storage volumes comprises selecting the storage volume according to a priority-based scheduling sequence, the priority-based scheduling sequence comprising a minimum number of slots per storage volume necessary to satisfy weights associated with each storage volume.

7. The method of claim 6, wherein a weight associated with a storage volume is based on a relative priority of the storage volume.

8. The method of claim 1, wherein selecting the storage volume to service based on credits for the storage volumes or based on priority for the storage volumes comprises:
  determining whether a storage volume with a non-empty I/O request queue and more than zero credits exists;
  responsive to determining that the storage volume with a non-empty I/O request queue and more than zero credits exists, selecting the storage volume based on credits for the storage volumes; and
  responsive to determining that the storage volume with a non-empty I/O request queue and more than zero credits does not exist, selecting the storage volume based on priority for the storage volumes.

9. The method of claim 8, wherein selecting the storage volume based on credits for the storage volumes comprises selecting the storage volume with a highest number of credits.

10. A non-transitory computer-readable storage medium storing computer program modules for selecting and dispatching an input/output (I/O) request from a set of I/O requests for a plurality of clients, the I/O requests specifying read or write from storage volumes for the clients, the storage volumes stored on a shared storage device, the storage volumes further having guaranteed minimum I/O rate requirements, the computer program modules executable to perform steps comprising:
  determining a storage volume to service, which comprises:
    determining whether an actual disk throughput of I/O requests for the shared storage device exceeds a first threshold rate that is based on and exceeds a reserved disk throughput for the shared storage device, wherein the reserved disk throughput is a rate of I/O requests necessary to meet the guaranteed minimum I/O rate requirements for the storage volumes stored on the shared storage device;
    responsive to determining that the actual disk throughput exceeds the first threshold rate, selecting the storage volume to service based on credits for the storage volumes or based on priority for the storage volumes; and
    responsive to determining that the actual disk throughput does not exceed the first threshold rate, selecting the storage volume to service based on the guaranteed minimum I/O rate requirements for the storage volumes stored on the shared storage device;
  determining an I/O request queue associated with the determined storage volume;
  retrieving an I/O request from the determined I/O request queue; and
  sending the retrieved I/O request to a persistence layer that includes the shared storage device.

11. The computer-readable storage medium of claim 10, wherein
  determining the storage volume to service further comprises:
    determining whether an I/O request queue associated with the storage volume is empty; and
    responsive to determining that the I/O request queue associated with the storage volume is empty:
      adding a credit for the storage volume;
      determining whether the actual disk throughput is less than a second threshold rate that is less than the reserved disk throughput;
      responsive to determining that the actual disk throughput meets the second threshold rate, selecting another storage volume to service based on the credits for the storage volumes or based on the priority for the storage volumes; and
      responsive to determining that the actual disk throughput is less than the second threshold rate, selecting the other storage volume to service based on the guaranteed minimum I/O rate requirements for the storage volumes stored on the shared storage device.

12. The computer-readable storage medium of claim 10, wherein the actual disk throughput is based on a number of I/O requests dispatched based on rate and a number of volumes that were selected based on rate but had zero I/O requests in an associated I/O request queue.

13. The computer-readable storage medium of claim 10, wherein selecting the storage volume to service based on the guaranteed minimum I/O rate requirements for the storage volumes stored on the shared storage device comprises selecting the storage volume according to a rate-based scheduling sequence, the rate-based scheduling sequence comprising a minimum number of slots per storage volume necessary to meet the guaranteed minimum I/O rate requirement for each storage volume stored on the shared storage device.

14. The computer-readable storage medium of claim 10, wherein selecting the storage volume to service based on priority for the storage volumes comprises selecting the storage volume according to a priority-based scheduling sequence, the priority-based scheduling sequence comprising a minimum number of slots per storage volume necessary to satisfy weights associated with each storage volume.

15. The computer-readable storage medium of claim 10, wherein selecting the storage volume to service based on credits for the storage volumes or based on priority for the storage volumes comprises:
  determining whether a storage volume with a non-empty I/O request queue and more than zero credits exists;
  responsive to determining that the storage volume with a non-empty I/O request queue and more than zero credits exists, selecting the storage volume based on credits for the storage volumes; and
  responsive to determining that the storage volume with a non-empty I/O request queue and more than zero credits does not exist, selecting the storage volume based on priority for the storage volumes.

16. A system for selecting and dispatching an input/output (I/O) request from a set of I/O requests for a plurality of clients, the I/O requests specifying read or write from storage volumes for the clients, the storage volumes stored on a shared storage device, the storage volumes further having guaranteed minimum I/O rate requirements, comprising:
  a non-transitory computer-readable storage medium storing computer program modules executable to perform steps comprising:
    determining a storage volume to service, which comprises:
      determining whether an actual disk throughput of I/O requests for the shared storage device exceeds a first threshold rate that is based on and exceeds a reserved disk throughput for the shared storage device, wherein the reserved disk throughput is a rate of I/O requests necessary to meet the guaranteed minimum I/O rate requirements for the storage volumes stored on the shared storage device;

responsive to determining that the actual disk throughput exceeds the first threshold rate, selecting the storage volume to service based on credits for the storage volumes or based on priority for the storage volumes; and responsive to determining that the actual disk throughput does not exceed the first threshold rate, selecting the storage volume to service based on the guaranteed minimum I/O rate requirements for the storage volumes stored on the shared storage device;

determining an I/O request queue associated with the determined storage volume;

retrieving an I/O request from the determined I/O request queue; and sending the retrieved I/O request to a persistence layer that includes the shared storage device; and a computer processor for executing the computer program modules.

17. The system of claim 16, wherein determining the storage volume to service further comprises:

determining whether an I/O request queue associated with the storage volume is empty; and responsive to determining that the I/O request queue associated with the storage volume is empty:
adding a credit for the storage volume;
determining whether the actual disk throughput is less than a second threshold rate that is less than the reserved disk throughput;
responsive to determining that the actual disk throughput meets the second threshold rate, selecting another storage volume to service based on the credits for the storage volumes or based on the priority for the storage volumes; and
responsive to determining that the actual disk throughput is less than the second threshold rate, selecting the other storage volume to service based on the guaranteed minimum I/O rate requirements for the storage volumes stored on the shared storage device.

18. The system of claim 16, wherein selecting the storage volume to service based on the guaranteed minimum I/O rate requirements for the storage volumes stored on the shared storage device comprises selecting the storage volume according to a rate-based scheduling sequence, the rate-based scheduling sequence comprising a minimum number of slots per storage volume necessary to meet the guaranteed minimum I/O rate requirement for each storage volume stored on the shared storage device.

19. The system of claim 16, wherein selecting the storage volume to service based on priority for the storage volumes comprises selecting the storage volume according to a priority-based scheduling sequence, the priority-based scheduling sequence comprising a minimum number of slots per storage volume necessary to satisfy weights associated with each storage volume.

20. The system of claim 16, wherein selecting the storage volume to service based on credits for the storage volumes or based on priority for the storage volumes comprises:

determining whether a storage volume with a non-empty I/O request queue and more than zero credits exists;

responsive to determining that the storage volume with a non-empty I/O request queue and more than zero credits exists, selecting the storage volume based on credits for the storage volumes; and responsive to determining that the storage volume with a non-empty I/O request queue and more than zero credits does not exist, selecting the storage volume based on priority for the storage volumes.

* * * * *